United States Patent
Hirata et al.

(10) Patent No.: US 7,804,667 B2
(45) Date of Patent: Sep. 28, 2010

(54) MAGNETORESISTIVE ELEMENT WITH A HEUSLER ALLOY LAYER THAT HAS A REGION IN WHICH AN ADDITIVE ELEMENT CHANGES IN CONCENTRATION

(75) Inventors: Kei Hirata, Tokyo (JP); Yoshihiro Tsuchiya, Tokyo (JP); Tomohito Mizuno, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 768 days.

(21) Appl. No.: 11/725,476

(22) Filed: Mar. 20, 2007

(65) Prior Publication Data

US 2007/0274010 A1    Nov. 29, 2007

(30) Foreign Application Priority Data

May 25, 2006  (JP) ............................. 2006-144927

(51) Int. Cl.
*G11B 5/39* (2006.01)
(52) U.S. Cl. .............................. 360/324.11; 360/324.12
(58) Field of Classification Search ............ 360/324.11, 360/324.12
See application file for complete search history.

(56) References Cited

U.S. PATENT DOCUMENTS

| 5,793,279 | A | 8/1998 | Nepela |
| 6,661,689 | B2 | 12/2003 | Asao et al. |
| 6,946,712 | B2 | 9/2005 | Asao |
| 2005/0073778 | A1 | 4/2005 | Hasegawa et al. |
| 2006/0203396 | A1 | 9/2006 | Ide et al. |

FOREIGN PATENT DOCUMENTS

| JP | A 10-177705 | 6/1998 |
| JP | A-2002-270790 | 9/2002 |
| JP | A-2003-163330 | 6/2003 |
| JP | A-2003-209228 | 7/2003 |
| JP | A 2005-116703 | 4/2005 |
| JP | A-2005-228998 | 8/2005 |
| JP | A-2006-245208 | 9/2006 |

*Primary Examiner*—Craig A. Renner
(74) *Attorney, Agent, or Firm*—Oliff & Berridge, PLC

(57) ABSTRACT

An MR element incorporates a nonmagnetic conductive layer, and a pinned layer and a free layer that are disposed to sandwich the nonmagnetic conductive layer. Each of the pinned layer and the free layer includes a Heusler alloy layer. The Heusler alloy layer contains a Heusler alloy in which atoms of a magnetic metallic element are placed at body-centered positions of unit cells, and an additive element that is a nonmagnetic metallic element that does not constitute the Heusler alloy. At least one of the pinned layer and the free layer includes a region in which the concentration of the additive element increases as the distance from the nonmagnetic conductive layer decreases, the region being adjacent to the nonmagnetic conductive layer.

6 Claims, 10 Drawing Sheets

MAGNETORESISTIVE ELEMENT WITH A HEUSLER ALLOY LAYER THAT HAS A REGION IN WHICH AN ADDITIVE ELEMENT CHANGES IN CONCENTRATION

BACKGROUND OF THE INVENTION

1. Field of the Invention

The present invention relates to a magnetoresistive element and a method of manufacturing the same, and to a thin-film magnetic head, a head gimbal assembly, a head arm assembly and a magnetic disk drive each of which incorporates the magnetoresistive element.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write (recording) head having an induction-type electromagnetic transducer for writing and a read (reproducing) head having a magnetoresistive (MR) element for reading are stacked on a substrate.

MR elements include giant magnetoresistive (GMR) elements utilizing a giant magnetoresistive effect, and tunnel magnetoresistive (TMR) elements utilizing a tunnel magnetoresistive effect.

It is required that the characteristics of a read head include high sensitivity and high output capability. GMR heads incorporating spin-valve GMR elements have been mass-produced as read heads that satisfy such requirements. Typically, a spin-valve GMR element incorporates: a nonmagnetic conductive layer having two surfaces facing toward opposite directions; a free layer disposed adjacent to one of the surfaces of the nonmagnetic conductive layer; a pinned layer disposed adjacent to the other of the surfaces of the nonmagnetic conductive layer; and an antiferromagnetic layer disposed adjacent to one of the surfaces of the pinned layer farther from the nonmagnetic conductive layer. The free layer is a ferromagnetic layer in which the direction of magnetization changes in response to a signal magnetic field. The pinned layer is a ferromagnetic layer in which the direction of magnetization is fixed. The antiferromagnetic layer is a layer that fixes the direction of magnetization in the pinned layer by means of exchange coupling with the pinned layer.

Conventional GMR heads have a structure in which a current used for detecting magnetic signals (that is hereinafter called a sense current) is fed in the direction parallel to the plane of each layer making up the GMR element. Such a structure is called a current-in-plane (CIP) structure. On the other hand, developments have been made for another type of GMR heads each having a structure in which the sense current is fed in a direction intersecting the plane of each layer making up the GMR element, such as the direction perpendicular to the plane of each layer making up the GMR element. Such a structure is called a current-perpendicular-to-plane (CPP) structure. A GMR element used for read heads having the CPP structure is hereinafter called a CPP-GMR element. A GMR element used for read heads having the CIP structure is hereinafter called a CIP-GMR element.

For a conventional CPP-GMR element, a CoFe alloy and an NiFe alloy have been mostly used as the material of the pinned layer and the free layer. In such a conventional CPP-GMR element, with regard to the configuration of layers capable of achieving a practical read gap length, the magnetoresistance change ratio (hereinafter called an MR ratio), which is a ratio of magnetoresistance change with respect to the resistance, is not more than approximately four percent and is therefore is insufficient in practice.

It is assumed that the low MR ratio of the above-mentioned conventional CPP-GMR element is attributable to a low spin polarization of the CoFe alloy or the NiFe alloy used as the material of the pinned layer and the free layer.

To increase the MR ratio, it has been proposed recently to employ CPP-GMR elements in which a half metal whose spin polarization is higher than a conventional metal such as a CoFe alloy is used as the material of the pinned layer and/or the free layer. JP 10-177705A discloses a GMR element in which a Heusler alloy, which is a type of half metal, is used as the material of the pinned layer and/or the free layer. Furthermore, JP 2005-116703A discloses a CPP-GMR element in which at least one of the pinned layer and the free layer includes a Heusler alloy layer.

The Heusler alloy will now be briefly described. The Heusler alloy is a term generally used for ordered alloys having a chemical composition of XYZ or $X_2YZ$. An ordered alloy having a chemical composition of XYZ is called a half Heusler alloy. An ordered alloy having a chemical composition of $X_2YZ$ is called a full Heusler alloy. Here, X is an element selected from the group consisting of the transition metals of the Fe family, the Co family, the Ni family and the Cu family of the periodic table, and the noble metals. Y is at least one element selected from the group consisting of Fe and the transition metals of the Ti family, the V family, the Cr family and the Mn family of the periodic table. Z is at least one element selected from the group consisting of the typical elements of the periods from the third to fifth periods inclusive of the periodic table.

There is a possibility that the MR ratio of a CPP-GMR element may be greatly increased by using a Heusler alloy layer as the pinned layer and/or the free layer. Conventionally, however, even if a CPP-GMR element in which a Heusler alloy layer is used as the pinned layer and/or the free layer is actually fabricated, the MR ratio thus obtained is not more than approximately 5 percent. It is assumed that one of the reasons relates to heat treatment performed when the Heusler alloy layer is formed. This will now be described in detail. Typically, a Heusler alloy layer is formed by making a film to be the Heusler alloy layer and then performing heat treatment on this film to change the crystal structure of the film into one that achieves a high spin polarization. However, in a CPP-GMR element in which a Heusler alloy layer is used as the pinned layer and/or the free layer, the material forming the nonmagnetic conductive layer diffuses into the Heusler alloy layer in the course of the above-mentioned heat treatment. It is assumed that, through this diffusion, the roughness of a surface of the Heusler alloy layer closer to the nonmagnetic conductive layer is thereby increased and/or the regularity of the crystal structure is degraded in a portion near the surface of the Heusler alloy layer closer to the nonmagnetic conductive layer. As a result, it is assumed that the spin polarization is reduced in the portion near the surface of the Heusler alloy layer closer to the nonmagnetic conductive layer, and that the MR ratio is thereby reduced.

OBJECT AND SUMMARY OF THE INVENTION

It is an object of the invention to provide a magnetoresistive element in which a current is fed in a direction intersecting the plane of each layer making up the magnetoresistive element, the magnetoresistive element having a high magnetoresistance change ratio, and to provide a method of manufacturing such a magnetoresistive element, and a thin-film magnetic head, a head gimbal assembly, a head arm assembly and a magnetic disk drive each of which incorporates the magnetoresistive element.

A magnetoresistive element of the invention incorporates: a nonmagnetic conductive layer having a first surface and a second surface that face toward opposite directions; a pinned layer disposed adjacent to the first surface of the nonmagnetic conductive layer, a direction of magnetization in the pinned layer being fixed; and a free layer disposed adjacent to the second surface of the nonmagnetic conductive layer, a direction of magnetization in the free layer changing in response to an external magnetic field. In the magnetoresistive element of the invention, a current for detecting magnetic signals is fed in a direction intersecting the plane of each of the layers that make up the magnetoresistive element.

In the magnetoresistive element of the invention, at least one of the pinned layer and the free layer includes a Heusler alloy layer. The Heusler alloy layer contains a Heusler alloy in which atoms of a magnetic metallic element are respectively placed at body-centered positions of unit cells, and contains an additive element that is a nonmagnetic metallic element that does not constitute the Heusler alloy. The at least one of the pinned layer and the free layer includes a region in which the concentration of the additive element increases as the distance from the nonmagnetic conductive layer decreases, the region being adjacent to the nonmagnetic conductive layer.

According to the magnetoresistive element of the invention, at least one of the pinned layer and the free layer includes the region in which the concentration of the additive element increases as the distance from the nonmagnetic conductive layer decreases, the region being adjacent to the nonmagnetic conductive layer. The magnetoresistance change ratio is thereby made higher, compared with a case in which neither the pinned layer nor the free layer includes such a region.

A method of manufacturing the magnetoresistive element of the invention includes the steps of forming the pinned layer, forming the nonmagnetic conductive layer, and forming the free layer. At least one of the step of forming the pinned layer and the step of forming the free layer includes the step of forming the Heusler alloy layer. The step of forming the Heusler alloy layer includes the step of forming a film that will be the Heusler alloy layer by undergoing heat treatment, and the step of performing the heat treatment on the film that will be the Heusler alloy layer. In the at least one of the pinned layer and the free layer, the region in which the concentration of the additive element increases as the distance from the nonmagnetic conductive layer decreases is formed by the heat treatment.

According to the method of manufacturing the magnetoresistive element of the invention, in at least one of the pinned layer and the free layer, there is formed the region in which the concentration of the additive element increases as the distance from the nonmagnetic conductive layer decreases, the region being adjacent to the nonmagnetic conductive layer. The magnetoresistive element thus manufactured achieves a higher magnetoresistance change ratio, compared with the case in which neither the pinned layer nor the free layer includes such a region.

According to the method of manufacturing the magnetoresistive element of the invention, in the film that will be the Heusler alloy layer, a proportion of the additive element with respect to a total amount of elements constituting the Heusler alloy may be within a range of 2 to 20 atomic percent inclusive.

A thin-film magnetic head of the invention incorporates: a medium facing surface that faces toward a recording medium; the magnetoresistive element of the invention disposed near the medium facing surface to detect a signal magnetic field sent from the recording medium; and a pair of electrodes for feeding a current for detecting magnetic signals to the magnetoresistive element in a direction intersecting the plane of each layer making up the magnetoresistive element.

A head gimbal assembly of the invention incorporates: a slider including the thin-film magnetic head of the invention and disposed to face toward a recording medium; and a suspension flexibly supporting the slider. A head arm assembly of the invention incorporates: a slider including the thin-film magnetic head of the invention and disposed to face toward a recording medium; a suspension flexibly supporting the slider; and an arm for making the slider travel across tracks of the recording medium, the suspension being attached to the arm.

A magnetic disk drive of the invention incorporates: a slider including the thin-film magnetic head of the invention and disposed to face toward a recording medium that is driven to rotate; and an alignment device supporting the slider and aligning the slider with respect to the recording medium.

According to the invention, in the magnetoresistive element, at least one of the pinned layer and the free layer includes the Heusler alloy layer, and the at least one of the pinned layer and the free layer includes the region in which the concentration of the additive element increases as the distance from the nonmagnetic conductive layer decreases, the region being adjacent to the nonmagnetic conductive layer. As a result, according to the invention, it is possible to increase the magnetoresistance change ratio of the magnetoresistive element to which a current is fed in a direction intersecting the plane of each of the layers making up the magnetoresistive element.

Other and further objects, features and advantages of the invention will appear more fully from the following description.

DETAILED DESCRIPTION OF THE PREFERRED EMBODIMENT

Figure 2:
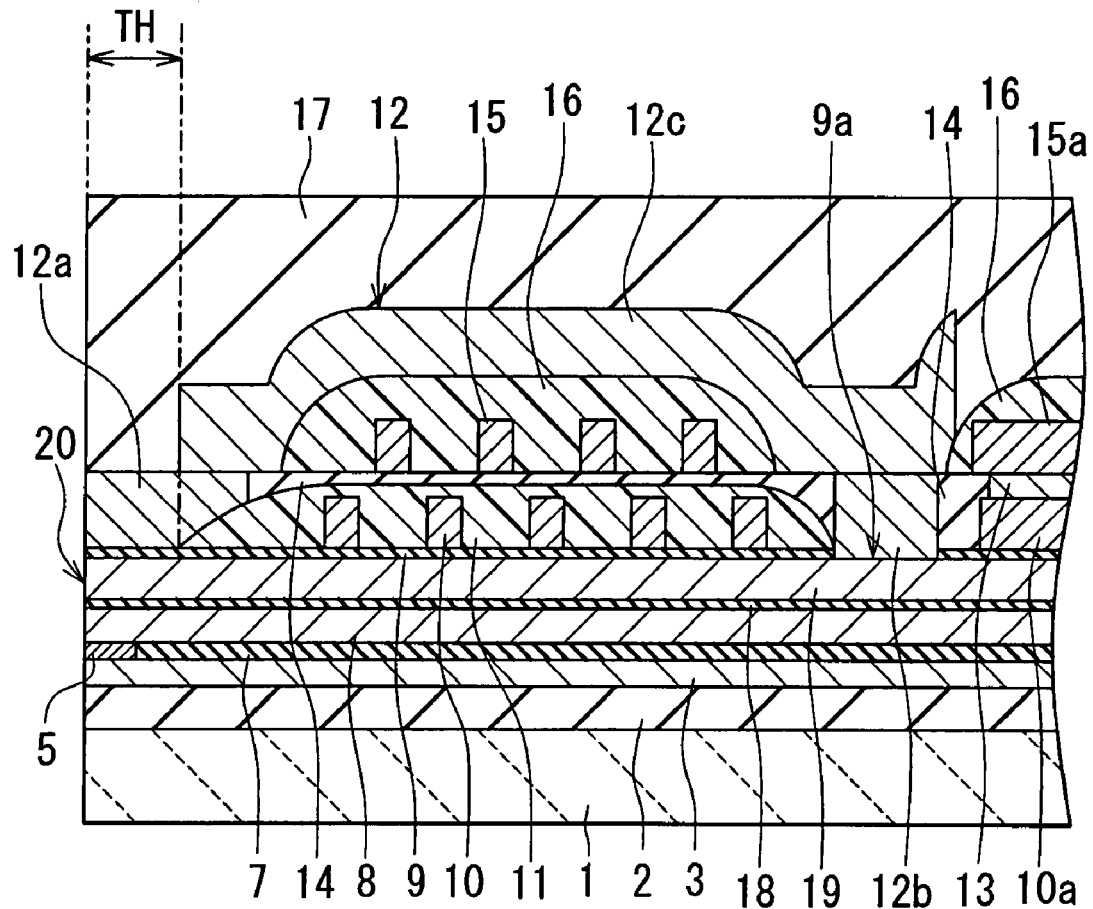
FIG. 2 is a cross-sectional view of a thin-film magnetic head of the embodiment of the invention, wherein the cross section is orthogonal to the medium facing surface and the substrate.
Figure 3:
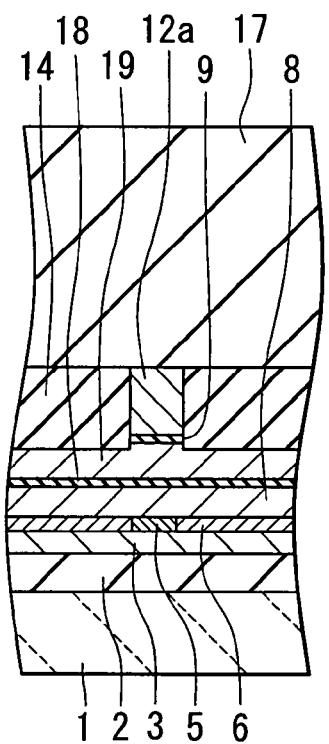
FIG. 3 is a cross-sectional view of the pole portion of the thin-film magnetic head of the embodiment of the invention, wherein the cross section is parallel to the medium facing surface.

A preferred embodiment of the invention will now be described in detail with reference to the accompanying drawings. Reference is now made to FIG. 2 and FIG. 3 to describe the outlines of the configuration and a manufacturing method of a thin-film magnetic head of the embodiment of the invention. FIG. 2 illustrates a cross section of the thin-film magnetic head orthogonal to a medium facing surface and a substrate. FIG. 3 illustrates a cross section of a pole portion of the thin-film magnetic head parallel to the medium facing surface.

In the method of manufacturing the thin-film magnetic head of the embodiment, first, an insulating layer 2 made of an insulating material such as alumina ($Al_2O_3$) and having a thickness of 0.2 to 2 µm, for example, is formed by a method such as sputtering on a substrate 1 made of a ceramic such as aluminum oxide and titanium carbide ($Al_2O_3$—TiC). Next, a first shield layer 3 for a read head having a specific pattern and made of a magnetic material such as NiFe or FeAlSi is formed on the insulating layer 2 by a method such as plating. Next, although not shown, an insulating layer of alumina, for example, is formed over the entire surface. Next, the insulating layer is polished by chemical mechanical polishing (CMP), for example, so that the first shield layer 3 is exposed, and the top surfaces of the first shield layer 3 and the insulating layer are thereby flattened.

Next, an MR element 5 for reading is formed on the first shield layer 3. Next, although not shown, an insulating film is formed to cover the two sides of the MR element 5 and the top surface of the first shield layer 3. The insulating film is made of an insulating material such as alumina. Next, two bias field applying layers 6 are formed to be located adjacent to the two sides of the MR element 5 with the insulating film disposed in between. Next, an insulating layer 7 is formed to be disposed around the MR element 5 and the bias field applying layers 6. The insulating layer 7 is made of an insulating material such as alumina.

Next, a second shield layer 8 for the read head is formed on the MR element 5, the bias field applying layers 6 and the insulating layer 7. The second shield layer 8 is made of a magnetic material and may be formed by plating or sputtering, for example. Next, a separating layer 18 made of a nonmagnetic material such as alumina is formed by sputtering, for example, on the second shield layer 8. Next, a bottom pole layer 19 provided for a write head and made of a magnetic material is formed on the separating layer 18 by plating or sputtering, for example. The magnetic material used for the second shield layer 8 and the bottom pole layer 19 is a soft magnetic material such as NiFe, CoFe, CoFeNi or FeN. Alternatively, a second shield layer that also functions as a bottom pole layer may be provided in place of the second shield layer 8, the separating layer 18 and the bottom pole layer 19.

Next, a write gap layer 9 made of a nonmagnetic material such as alumina and having a thickness of 50 to 300 nm, for example, is formed on the bottom pole layer 19 by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 µm, for example, is formed on the write gap layer 9. In FIG. 2 numeral 10a indicates a connecting portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat treatment is performed at a specific temperature to flatten the surface of the insulating layer 11. Through this heat treatment, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to a medium facing surface 20 described later toward the medium facing surface 20. The top pole layer 12 is made up of the track width defining layer 12a, and a coupling portion layer 12b and a yoke portion layer 12c that will be described later.

The track width defining layer 12a has: a tip portion that is formed on the write gap layer 9 and functions as the pole portion of the top pole layer 12; and a connecting portion that is formed on the sloped portion of the insulating layer 11 closer to the medium facing surface 20 and is connected to the yoke portion layer 12c. The tip portion has a width equal to the write track width. The connecting portion has a width greater than that of the tip portion.

When the track width defining layer 12a is formed, the coupling portion layer 12b made of a magnetic material is formed in the contact hole 9a, and a connecting layer 13 made of a magnetic material is formed on the connecting portion 10a at the same time. The coupling portion layer 12b makes up a portion of the top pole layer 12 that is magnetically coupled to the bottom pole layer 19.

Next, pole trimming is performed. That is, in a region around the track width defining layer 12a, the write gap layer 9 and at least a portion of the pole portion of the bottom pole layer 19 close to the write gap layer 9 are etched, using the track width defining layer 12a as a mask. As a result, as shown in FIG. 3, a trim structure is formed, wherein the pole portion of the top pole layer 12, the write gap layer 9 and at least a portion of the pole portion of the bottom pole layer 19 have equal widths. The trim structure has an effect of preventing an increase in effective track width resulting from an expansion of magnetic flux near the write gap layer 9.

Next, an insulating layer 14 made of an inorganic insulating material such as alumina and having a thickness of 3 to 4 µm, for example, is formed over the entire surface. The insulating layer 14 is then polished by CMP, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3

μm, for example, is formed on the flattened insulating layer 14. In FIG. 2 numeral 15a indicates a connecting portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat treatment is performed at a specific temperature to flatten the surface of the insulating layer 16. Through this heat treatment, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. An end of the yoke portion layer 12c closer to the medium facing surface 20 is located apart from the medium facing surface 20. The yoke portion layer 12c is connected to the bottom pole layer 19 through the coupling portion layer 12b.

Next, an overcoat layer 17 made of alumina, for example, is formed to cover the entire surface. Finally, machining of the slider including the foregoing layers is performed to form the medium facing surface 20 of the thin-film magnetic head including the write head and the read head. The thin-film magnetic head is thus completed.

The thin-film magnetic head thus manufactured incorporates the medium facing surface 20 that faces toward a recording medium, the read head and the write head. The configuration of the read head will be described in detail later.

The write head incorporates the bottom pole layer 19 and the top pole layer 12 that are magnetically coupled to each other and include the pole portions that are opposed to each other and placed in regions on a side of the medium facing surface 20. The write head further incorporates: the write gap layer 9 provided between the pole portion of the bottom pole layer 19 and the pole portion of the top pole layer 12; and the thin-film coil including the portions 10 and 15 at least part of which is placed between the bottom pole layer 19 and the top pole layer 12 and insulated from the bottom pole layer 19 and the top pole layer 12. In this thin-film magnetic head, as shown in FIG. 2, the length from the medium facing surface 20 to the end of the insulating layer 11 closer to the medium facing surface 20 corresponds to throat height TH. The throat height is the length (height) from the medium facing surface 20 to the point at which the distance between the two pole layers starts to increase. Although the write head for the longitudinal magnetic recording system is shown in FIG. 2 and FIG. 3, the write head of the embodiment may be one for the perpendicular magnetic recording system.

Figure 1:
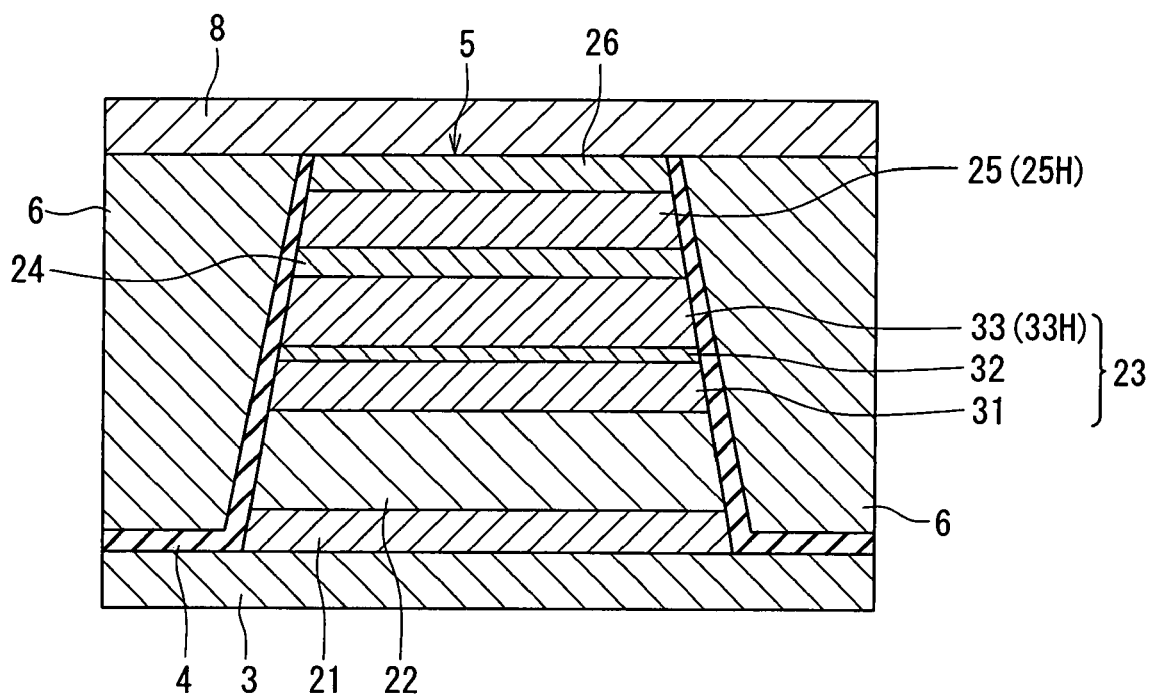
FIG. 1 is a cross-sectional view of a read head of an embodiment of the invention, wherein the cross section is parallel to the medium facing surface.

Reference is now made to FIG. 1 to describe the details of the configuration of the read head. FIG. 1 is a cross-sectional view of the read head parallel to the medium facing surface.

The read head of the embodiment incorporates: the first shield layer 3 and the second shield layer 8 disposed with a specific space from each other; the MR element 5 disposed between the first shield layer 3 and the second shield layer 8; the insulating film 4 that covers the two sides of the MR element 5 and the top surface of the first shield layer 3; and the two bias field applying layers 6 disposed adjacent to the two sides of the MR element 5 with the insulating film 4 disposed in between. The insulating film 4 is made of alumina, for example. The bias field applying layers 6 are each made of a hard magnetic layer (hard magnet) or a layered structure made up of ferromagnetic layers and antiferromagnetic layers, for example. To be specific, the bias field applying layers 6 are made of CoPt or CoCrPt, for example.

The read head of the embodiment has the CPP structure. The first shield layer 3 and the second shield layer 8 also function as a pair of electrodes for feeding a sense current to the MR element 5 in a direction intersecting the plane of each layer making up the MR element 5, such as the direction perpendicular to the plane of each layer making up the MR element 5. Besides the first and second shield layers 3 and 8, a pair of electrodes may also be provided on the top and bottom of the MR element 5, respectively. The MR element 5 is a CPP-GMR element. The resistance of the MR element 5 changes in response to an external magnetic field, that is, a signal magnetic field from the recording medium. The sense current is fed in a direction intersecting the plane of each layer making up the MR element 5, such as the direction perpendicular to the plane of each layer making up the MR element 5. It is possible to determine the resistance of the MR element 5 from the sense current. It is thereby possible to read data stored on the recording medium through the use of the read head.

The MR element 5 incorporates an underlying layer 21, an antiferromagnetic layer 22, a pinned layer 23, a nonmagnetic conductive layer 24, a free layer 25 and a protection layer 26 that are stacked in this order on the first shield layer 3. The pinned layer 23 is a layer in which the direction of magnetization is fixed. The antiferromagnetic layer 22 is a layer that fixes the direction of magnetization in the pinned layer 23 by exchange coupling with the pinned layer 23. The underlying layer 21 is provided for improving the crystallinity and orientability of each layer formed thereon and particularly for enhancing the exchange coupling between the antiferromagnetic layer 22 and the pinned layer 23. The free layer 25 is a layer in which the direction of magnetization changes in response to an external magnetic field, that is, a signal magnetic field sent from the recording medium. The protection layer 26 is a layer for protecting the layers therebelow.

The underlying layer 21 has a thickness of 2 to 6 nm, for example. The underlying layer 21 may be made of a layered structure made up of a Ta layer and an Ru layer, for example.

The antiferromagnetic layer 22 has a thickness of 5 to 30 nm, for example, and may be made of an antiferromagnetic material including Mn and at least one element $M_{II}$ among the group consisting of Pt, Ru, Rh, Pd, Ni, Cu, Ir, Cr and Fe. The Mn content of the material preferably falls within a range of 35 to 95 atomic percent inclusive. The content of the other element $M_{II}$ of the material preferably falls within a range of 5 to 65 atomic percent inclusive. One type of antiferromagnetic material is a non-heat-induced antiferromagnetic material that exhibits antiferromagnetism without any heat treatment and induces an exchange coupling magnetic field between a ferromagnetic material and itself Another type of antiferromagnetic material is a heat-induced antiferromagnetic material that exhibits antiferromagnetism by undergoing heat treatment. The antiferromagnetic layer 22 may be made of either of these types. The non-heat-induced antiferromagnetic materials include an Mn alloy that has a γ phase, such as RuRhMn, FeMn, and IrMn. The heat-induced antiferromagnetic materials include an Mn alloy that has a regular crystal structure, such as PtMn, NiMn, and PtRhMn.

As a layer for fixing the direction of magnetization in the pinned layer 23, a hard magnetic layer made of a hard magnetic material such as CoPt may be provided in place of the antiferromagnetic layer 22 described above. In this case, the material of the underlying layer 21 is Cr, CrTi or TiW, for example.

The direction of magnetization is fixed in the pinned layer 23 by means of the exchange coupling with the antiferromagnetic layer 22 at the interface between the antiferromagnetic layer 22 and the pinned layer 23. The pinned layer 23 of the embodiment is a so-called synthetic pinned layer that incorporates an outer layer 31, a nonmagnetic middle layer 32 and an inner layer 33 that are stacked in this order on the antiferromagnetic layer 22. The outer layer 31 includes a ferromagnetic layer made of a ferromagnetic material including at least Co selected from the group consisting of Co and Fe. The inner layer 33 and the outer layer 31 are antiferromagnetic-coupled to each other and the directions of magnetization thereof are fixed to opposite directions. The outer layer 31 has a thickness of 3 to 7 nm, for example. The inner layer 33 has a thickness of 3 to 10 nm, for example.

The nonmagnetic middle layer 32 has a thickness of 0.35 to 1.0 nm, for example, and is made of a nonmagnetic material including at least one element among the group consisting of Ru, Rh, Ir, Re, Cr, Zr and Cu, for example. The nonmagnetic middle layer 32 is provided for creating antiferromagnetic exchange coupling between the inner layer 33 and the outer layer 31, and for fixing the magnetizations of these layers to opposite directions. The magnetizations of the inner layer 33 and the outer layer 31 in opposite directions include not only the case in which there is a difference of 180 degrees between these directions of magnetizations, but also the case in which there is a difference of 180±20 degrees between them.

The inner layer 33 includes a Heusler alloy layer 33H, which will be described in detail later. The whole of the inner layer 33 may be made of the Heusler alloy layer 33H. Alternatively, the inner layer 33 may include an underlying magnetic layer disposed between the nonmagnetic middle layer 32 and the Heusler alloy layer 33H. Furthermore, the inner layer 33 may include a middle magnetic layer disposed between the Heusler alloy layer 33H and the nonmagnetic conductive layer 24. The underlying magnetic layer and the middle magnetic layer are made of CoFe, for example. The Heusler alloy layer 33H has a thickness of 3 to 7 nm, for example.

The nonmagnetic conductive layer 24 has a thickness of 1.0 to 4.0 nm, for example, and is made of a nonmagnetic conductive material that includes 80 weight percent or greater of a nonmagnetic metallic element, such as at least one element selected from the group consisting of Cu, Au and Ag.

The free layer 25 includes a Heusler alloy layer 25H, which will be described in detail later. The whole of the free layer 25 may be made of the Heusler alloy layer 25H. Alternatively, the free layer 25 may include an underlying magnetic layer disposed between the nonmagnetic conductive layer 24 and the Heusler alloy layer 25H. The underlying magnetic layer is made of CoFe, for example. Furthermore, the free layer 25 may include a magnetic layer disposed between the Heusler alloy layer 25H and the protection layer 26. This magnetic layer is made of a soft magnetic material such as NiFe. The free layer 25 has a thickness of 2 to 10 nm, for example. The Heusler alloy layer 25H has a thickness of 2 to 9 nm, for example.

The protection layer 26 has a thickness of 0.5 to 10 nm, for example. The protection layer 26 may be made of an Ru layer.

A method of manufacturing the MR element 5 of the embodiment includes the steps of forming the underlying layer 21, the antiferromagnetic layer 22, the pinned layer 23, the nonmagnetic conductive layer 24, the free layer 25 and the protection layer 26, respectively, each by sputtering, for example.

The operation of the thin-film magnetic head of the embodiment will now be described. The thin-film magnetic head writes data on a recording medium by using the write head and reads data written on the recording medium by using the read head.

In the read head, the direction of the bias magnetic field created by the bias field applying layers 6 intersects the direction orthogonal to the medium facing surface 20 at a right angle. In the MR element 5 the direction of magnetization in the free layer 25 is aligned with the direction of the bias magnetic field when no signal magnetic field exists. The direction of magnetization in the pinned layer 23 is fixed to the direction orthogonal to the medium facing surface 20.

In the MR element 5, the direction of magnetization of the free layer 25 changes in response to the signal magnetic field sent from the recording medium. The relative angle between the direction of magnetization of the free layer 25 and the direction of magnetization of the pinned layer 23 is thereby changed. As a result, the resistance of the MR element 5 changes. The resistance of the MR element 5 is obtained from the potential difference between the first and second shield layers 3 and 8 when a sense current is fed to the MR element 5 from the shield layers 3 and 8. In such a manner, the data stored on the recording medium is read by the read head.

Features of the MR element 5 and the method of manufacturing the same of the embodiment will now be described. The MR element 5 of the embodiment incorporates: the nonmagnetic conductive layer 24 having a first surface (bottom surface) and a second surface (top surface) facing toward opposite directions; the pinned layer 23 disposed adjacent to the first surface (the bottom surface) of the nonmagnetic conductive layer 24, the direction of magnetization in the pinned layer 23 being fixed; and the free layer 25 disposed adjacent to the second surface (the top surface) of the nonmagnetic conductive layer 24, the direction of magnetization in the free layer 25 changing in response to an external magnetic field. A sense current is fed to the MR element 5 in a direction intersecting the plane of each layer making up the MR element 5, such as the direction perpendicular to the plane of each layer making up the MR element 5.

The pinned layer 23 of the embodiment incorporates the outer layer 31, the nonmagnetic middle layer 32 and the inner layer 33 that are stacked in this order on the antiferromagnetic layer 22. The inner layer 33 includes the Heusler alloy layer 33H. The free layer 25 includes the Heusler alloy layer 25H.

In the method of manufacturing the MR element 5 of the embodiment, the step of forming the pinned layer 23 includes the steps of forming the outer layer 31, the nonmagnetic middle layer 32 and the inner layer 33, respectively, each by sputtering, for example. The step of forming the inner layer 33 includes the step of forming the Heusler alloy layer 33H. The step of forming the free layer 25 includes the step of forming the Heusler alloy layer 25H.

Each of the Heusler alloy layer 33H included in the inner layer 33 and the Heusler alloy layer 25H included in the free layer 25 contains a Heusler alloy in which atoms of a magnetic metallic element are respectively placed at body-centered positions of unit cells, and an additive element that is a nonmagnetic metallic element that does not constitute the Heusler alloy. At least one of the inner layer 33 and the free layer 25 includes a region in which the concentration of the additive element increases as the distance from the nonmagnetic conductive layer 24 decreases, the region being adjacent to the nonmagnetic conductive layer 24.

The Heusler alloy of the embodiment has a chemical composition of $X_2YZ$. Here, the atoms of the element X are placed at body-centered positions of unit cells. In the embodiment, the element X is a magnetic metallic element, that is, at least one element selected from the group consisting of Fe, Co and Ni. Y is at least one element selected from the group consisting of Fe and the transition metals of the Ti family, the V family, the Cr family and the Mn family of the periodic table. Z is at least one element selected from the group consisting of the typical elements of the periods from the third to fifth periods inclusive of the periodic table. An example of the Heusler alloy of the embodiment is a $Co_2MnSi$ alloy. The lattice constant of the Heusler alloy of the embodiment is within a range of 2.75 to 2.85 Å inclusive.

The additive element contained in the Heusler alloy layers 33H and 25H is preferably an element that has a high affinity for the nonmagnetic metallic element constituting the nonmagnetic conductive layer 24. To be specific, the additive element is preferably at least one element selected from the Group 5 to 11 elements of the periodic table, and more preferably at least one element selected from the group consisting of Cu and the noble metal elements (Au, Ag, Pt, Pd, Rh, Ir, Ru and Os). In particular, to enhance the affinity between the nonmagnetic metallic element constituting the nonmagnetic conductive layer 24 and the additive element contained in the Heusler alloy layers 33H and 25H, it is preferred that each of the nonmagnetic metallic element constituting the nonmagnetic conductive layer 24 and the additive element contained in the Heusler alloy layers 33H and 25H be at least one element selected from the group consisting of Cu and the noble metal elements. The nonmagnetic metallic element and the additive element may be the same element.

In the embodiment, each of the steps of forming the Heusler alloy layers 33H and 25H includes the steps of: forming a film that will be the Heusler alloy layer by undergoing heat treatment; and performing the heat treatment on the film that will be the Heusler alloy layer. In the step of forming the film that will be the Heusler alloy layer, a film containing the elements constituting the Heusler alloy and the additive element is formed by sputtering, for example. In the film that will be the Heusler alloy layer, the proportion of the additive element with respect to the total amount of the elements constituting the Heusler alloy is preferably within a range of 2 to 20 atomic percent inclusive. The heat treatment is a treatment for changing the crystal structure of the Heusler alloy into the B2 or $L2_1$ structure by heating the film that will be the Heusler alloy layer at a specific temperature. This specific temperature is within a range of 270° C. to 350° C., for example.

It is preferred that the heat treatment in the step of forming the Heusler alloy layer 33H included in the inner layer 33 and the heat treatment in the step of forming the Heusler alloy layer 25H included in the free layer 25 be performed at the same time at some point after the film that will be the Heusler alloy layer included in the free layer 25 is formed.

Figure 8:
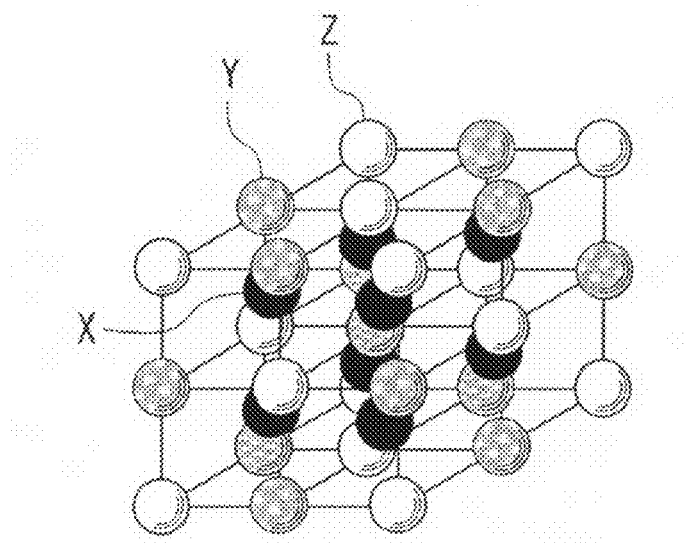
FIG. 8 is a view for illustrating an $L2_1$ structure.
Figure 9:
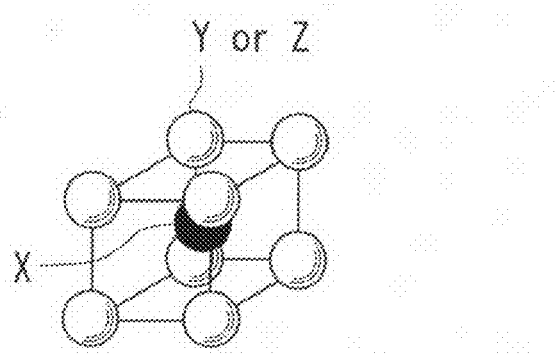
FIG. 9 is a view for illustrating a B2 structure.
Figure 10:
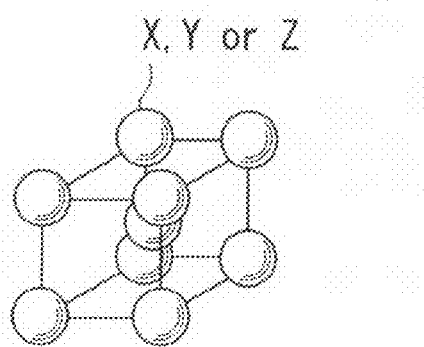
FIG. 10 is a view for illustrating an A2 structure.
Figure 11:
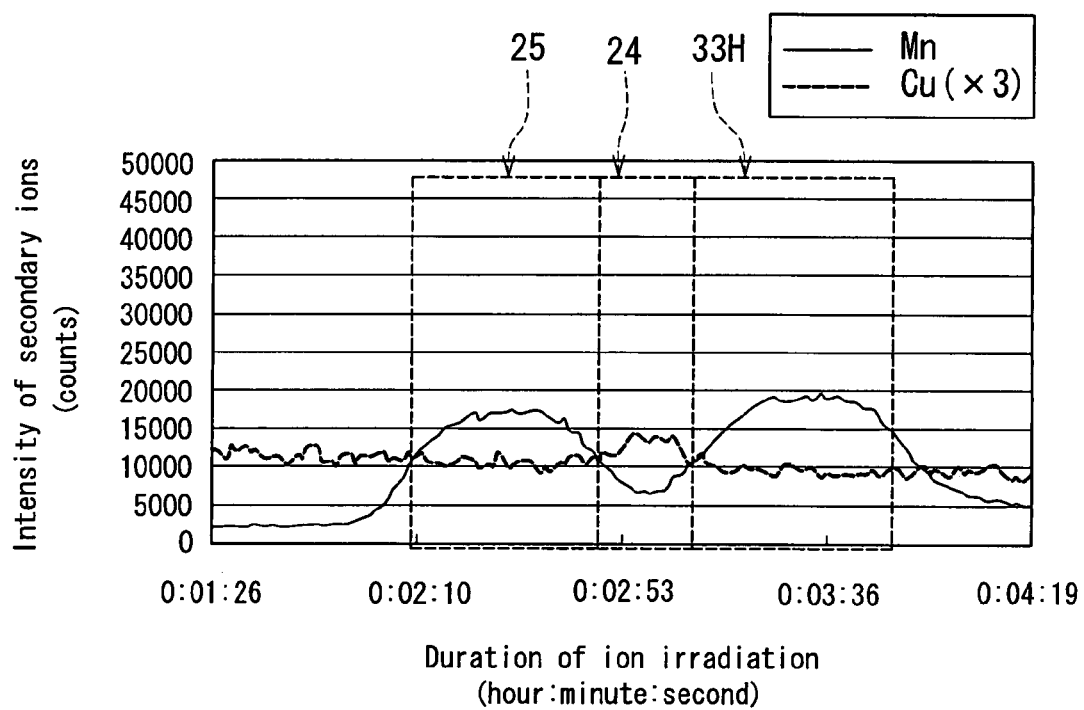
FIG. 11 is a plot showing a result of an experiment indicating an effect of the embodiment of the invention.

Reference is now made to FIG. 8 to FIG. 10 to describe types of the crystal structure that a typical full Heusler alloy can have. Here, the chemical composition of a typical full Heusler alloy is indicated as $X_2YZ$, as in the description of the section 'Description of the Related Art'. A typical full Heusler alloy can have three types of crystal structure, that is, the $L2_1$ structure, the B2 structure and the A2 structure. FIG. 8 illustrates the $L2_1$ structure. FIG. 9 illustrates the B2 structure. FIG. 10 illustrates the A2 structure. Each of the $L2_1$ structure, the B2 structure and the A2 structure is similar to the body-centered cubic structure.

In the $L2_1$ structure shown in FIG. 8, atoms of the element X are respectively placed at body-centered positions of unit cells, and atoms of the element Y and atoms of the element Z are alternately placed at vertexes of the unit cells regularly.

In the B2 structure shown in FIG. 9, atoms of the element X are respectively placed at body-centered positions of unit cells, and atoms of the element Y or atoms of the element Z are randomly placed at vertexes of the unit cells.

In the A2 structure shown in FIG. 10, atoms of the element X, atoms of the element Y, or atoms of the element Z are randomly placed at each of body-centered positions and vertexes of unit cells.

Among the $L2_1$ structure, the B2 structure and the A2 structure, a high spin polarization occurs in the $L2_1$ structure and the B2 structure.

In the embodiment at least one of the inner layer 33 and the free layer 25 includes the region in which the concentration of the additive element increases as the distance from the nonmagnetic conductive layer 24 decreases, the region being adjacent to the nonmagnetic conductive layer 24. This region is formed by diffusion of atoms of the additive element toward the nonmagnetic conductive layer 24 in the step of performing the heat treatment on the film that will be the Heusler alloy layer. In particular, if the additive element contained in the Heusler alloy layers 33H and 25H is an element having a high affinity for the nonmagnetic metallic element constituting the nonmagnetic conductive layer 24, it is easy to form the above-mentioned region in the above-mentioned step of performing the heat treatment.

In the case in which the inner layer 33 includes the middle magnetic layer disposed between the Heusler alloy layer 33H and the nonmagnetic conductive layer 24, the above-mentioned region of the inner layer 33 is a region that includes at least part of the middle magnetic layer. In the case in which the free layer 25 includes the underlying magnetic layer disposed between the nonmagnetic conductive layer 24 and the Heusler alloy layer 25H, the above-mentioned region of the free layer 25 is a region that includes at least part of the underlying magnetic layer.

According to the embodiment as thus described, in the MR element 5, the pinned layer 23 (the inner layer 33) and the free layer 25 include the Heusler alloy layers 33H and 25H, respectively. Each of the Heusler alloy layers 33H and 25H contains a Heusler alloy in which atoms of a magnetic metallic element are respectively placed at body-centered positions of unit cells, and the additive element that is a nonmagnetic metallic element that does not constitute the Heusler alloy.

The Heusler alloy in which atoms of a magnetic metallic element are respectively placed at body-centered positions of unit cells is capable of achieving a high Curie temperature. Therefore, according to the embodiment, it is possible to achieve the MR element 5 that is practical and suitable for use in a magnetic head.

In the embodiment at least one of the pinned layer 23 and the free layer 25 includes the region in which the concentration of the additive element increases as the distance from the nonmagnetic conductive layer 24 decreases, the region being adjacent to the nonmagnetic conductive layer 24. As a result, according to the embodiment, it is possible to make the MR ratio of the MR element 5 higher, compared with the case in which neither the pinned layer 23 nor the free layer 25 includes the above-mentioned region, as will be seen from results of an experiment shown later.

The following is an estimated reason why the MR ratio of the MR element 5 is higher when at least one of the pinned layer 23 and the free layer 25 includes the above-mentioned region, compared with the case in which neither the pinned layer 23 nor the free layer 25 includes the above-mentioned region. In the case in which the film to be the Heusler alloy layer does not contain any additive element, the above-mentioned region will not be formed. In this case, in the step of performing heat treatment on the film to be the Heusler alloy layer, atoms of the nonmagnetic metallic element constituting the nonmagnetic conductive layer 24 diffuse toward each of the Heusler alloy layers 33H and 25H. It is assumed that this is a cause of reducing the MR ratio of the MR element.

In contrast, in the embodiment, in the step of performing heat treatment on the film to be the Heusler alloy layer, atoms of the additive element contained in the film to be the Heusler alloy layer diffuse toward the nonmagnetic conductive layer 24, while atoms of the nonmagnetic metallic element constituting the nonmagnetic conductive layer 24 diffuse toward each of the Heusler alloy layers 33H and 25H. As a result, the above-mentioned region is formed. As thus described, in the embodiment, in a neighborhood of the surface of each of the Heusler alloy layers 33H and 25H closer to the nonmagnetic conductive layer 24, there occur the diffusion of the atoms of the nonmagnetic metallic element constituting the nonmagnetic conductive layer 24 toward each of the Heusler alloy layers 33H and 25H, and the diffusion of the atoms of the additive element toward the nonmagnetic conductive layer 24, which is estimated to contribute to a reduction in roughness of the surface of each of the Heusler alloy layers 33H and 25H closer to the nonmagnetic conductive layer 24 and to an improvement in regularity of the crystal structure near the surface of each of the Heusler alloy layers 33H and 25H closer to the nonmagnetic conductive layer 24. It is assumed that the spin polarization in the neighborhood of the surface of each of the Heusler alloy layers 33H and 25H closer to the nonmagnetic conductive layer 24 is thereby made higher and the MR ratio of the MR element 5 is thus made higher, compared with the case in which no additive element is contained and therefore the above-mentioned region does not exist.

In the embodiment, since the film to be the Heusler alloy layer contains the additive element, it is possible to reduce the temperature at which the heat treatment is performed, compared with the case in which the film to be the Heusler alloy layer contains no additive element. If the heat treatment is performed at a high temperature, crystal grains in the first shield layer 3 may be enlarged during the heat treatment and the permittivity of the first shield layer 3 may be thereby reduced and/or the throughput of manufacture of the MR element 5 may be reduced. The embodiment is capable of preventing these problems.

Results of the experiment indicating the effects of the embodiment will now be described. In the experiment, samples 1 to 6 of the MR element were fabricated. Table 1 below lists the film configurations of the samples 1 to 6. In the samples 1 to 6, the inner layer 33 is made up of an underlying magnetic layer made of CoFe and the Heusler alloy layer 33H, and the free layer 25 is made up only of the Heusler alloy layer 25H.

TABLE 1

| Layer | | Substance | Thickness (nm) |
|---|---|---|---|
| Protection layer | | Ru | 2 |
| Free layer | | $Co_2MnSi$ | 6 |
| Nonmagnetic conductive layer | | Cu, Ag or CuAg | 2 |
| Pinned layer | Inner layer | $Co_2MnSi$ | 6 |
| | | CoFe | 2 |
| | Nonmagnetic middle layer | Ru | 0.7 |

TABLE 1-continued

| Layer | Substance | Thickness (nm) |
|---|---|---|
| Outer layer | CoFe | 5 |
| Antiferromagnetic layer | IrMn | 5 |
| Underlying layer | Ru | 2 |
| | Ta | 2 |

There are differences among the samples 1 to 6 in the additive elements contained in the Heusler alloy layer 33H of the inner layer 33 and the free layer 25 (the Heusler alloy layer 25H), the material of the nonmagnetic conductive layer 24, and the presence or absence of heat treatment of the film to be the Heusler alloy layer. These conditions will be described with reference to Table 2 below. In the sample 1, the Heusler alloy layer 33H of the inner layer 33 and the free layer 25 are formed of Heusler alloy layers that contain a Heusler alloy but do not contain any additive element. In the samples 2 to 6, the Heusler alloy layer 33H of the inner layer 33 and the free layer 25 are formed of Heusler alloy layers that contain a Heusler alloy and the additive elements listed on Table 2. The Heusler alloy of each of the samples 1 to 6 is a $Co_2MnSi$ alloy. The heat treatment for each of the samples 1 and 3 to 6 was performed at 320° C.

TABLE 2

| Sample | Additive element of Heusler alloy layer of inner layer | material of nonmagnetic conductive layer | Additive element of free layer | Heat treatment | MR ratio (%) |
|---|---|---|---|---|---|
| 1 | None | Cu | None | Present | 5.0 |
| 2 | Ag | Cu | Ag | Absent | 0.2 |
| 3 | Ag | Cu | Ag | Present | 9.0 |
| 4 | Au | Cu | Au | Present | 9.1 |
| 5 | Ag | Ag | Ag | Present | 8.6 |
| 6 | Ag | CuAg | Ag | Present | 9.5 |

In the experiment, for the samples 1 to 6, the concentrations of the elements in the Heusler alloy layer 33H of the inner layer 33, the nonmagnetic conductive layer 24 and the free layer 25 were analyzed by secondary ion mass analysis. FIG. 11 to FIG. 16 show the results. FIG. 11 to FIG. 16 show the results of analysis for the samples 1 to 6, respectively. In the analysis, the intensity of secondary ions was measured while sputtering each of the samples with primary ions in the order of the free layer 25, the nonmagnetic conductive layer 24 and the Heusler alloy layer 33H of the inner layer 33. In FIG. 11 to FIG. 16 the horizontal axis indicates the duration of irradiation with the primary ions corresponding to locations in the samples along the direction of thickness thereof, and the vertical axis indicates the intensity of the secondary ions corresponding to the concentrations of the elements. In FIG. 11 to FIG. 16 the intensity of the secondary ions is indicated as a three-fold value for Cu, and is indicated as a thirty-fold value for each of Ag and Au. In FIG. 11 to FIG. 16 the ranges with numerals 25, 24 and 33H indicate the ranges of the free layer 25, the nonmagnetic conductive layer 24 and the Heusler alloy layer 33H of the inner layer 33, respectively. In the experiment the MR ratio of each of the samples 1 to 6 was also measured. The MR ratio of each of the samples 1 to 6 is shown in Table 2.

In the sample 1, each of the Heusler alloy layer 33H of the inner layer 33 and the free layer 25 is formed of a Heusler alloy layer that does not contain any additive element. The MR ratio of the sample 1 is 5.0% which is not sufficiently high.

Figure 12:
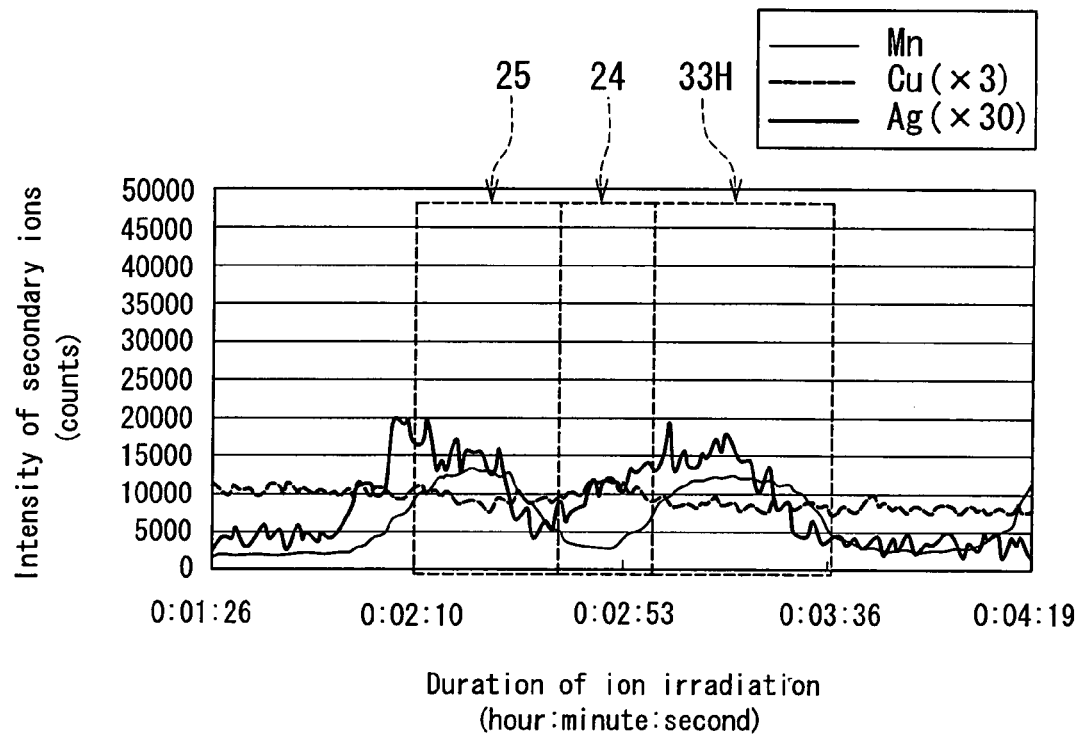
FIG. 12 is a plot showing a result of the experiment indicating the effect of the embodiment of the invention.

In the sample 2, each of the Heusler alloy layer 33H of the inner layer 33 and the free layer 25 is formed of a Heusler alloy layer that contains a Heusler alloy and an additive element Ag. However, since no heat treatment is performed in the sample 2, the MR ratio thereof is 0.2% which is very low. Furthermore, in the sample 2, as shown in FIG. 12, neither the Heusler alloy layer 33H of the inner layer 33 nor the free layer 25 has a region in which the concentration of the additive element Ag increases as the distance from the nonmagnetic conductive layer 24 decreases, the region being adjacent to the nonmagnetic conductive layer 24.

Figure 13:
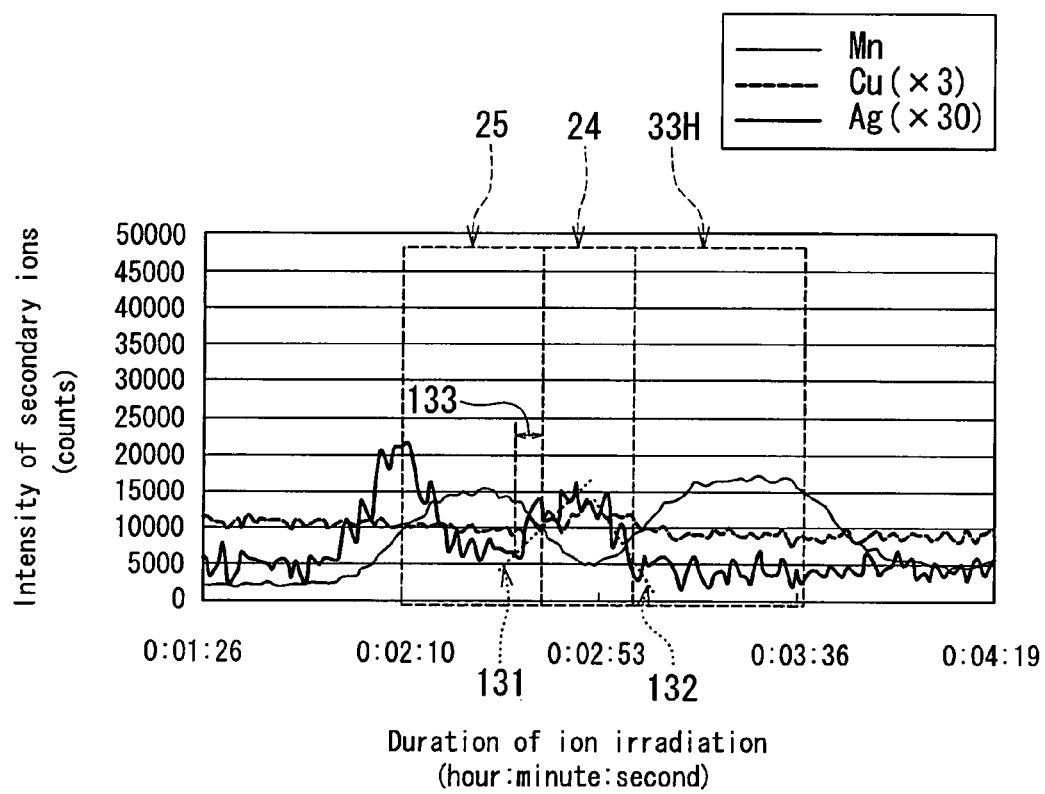
FIG. 13 is a plot showing a result of the experiment indicating the effect of the embodiment of the invention.

In the sample 3, the nonmagnetic conductive layer 24 is made of Cu, and each of the Heusler alloy layer 33H of the inner layer 33 and the free layer 25 is formed of a Heusler alloy layer that contains a Heusler alloy and the additive element Ag. As shown in FIG. 13, the sample 3 has a region in which the concentration of the additive element Ag increases as the distance from the middle of the nonmagnetic conductive layer 24 along the direction of thickness decreases, the region being formed near the interface between the free layer 25 and the nonmagnetic conductive layer 24 and including this interface. In addition, the sample 3 has a region in which the concentration of the additive element Ag increases as the distance from the middle of the nonmagnetic conductive layer 24 along the direction of thickness decreases, the region being formed near the interface between the Heusler alloy layer 33H of the inner layer 33 and the nonmagnetic conductive layer 24 and including this interface. In FIG. 13 each of two dotted lines with numerals 131 and 132 indicates the gradient of concentration (intensity of secondary ions) of the additive element Ag. According to the results of measurement shown in FIG. 13, although there are small variations in intensity of the secondary ions, these variations result from measurement errors. It is assumed that the gradients of concentration of the additive element Ag in a neighborhood of the interface between the free layer 25 and the nonmagnetic conductive layer 24 and in a neighborhood of the interface between the Heusler alloy layer 33H of the inner layer 33 and the nonmagnetic conductive layer 24 are such ones indicated with the two dotted lines with numerals 131 and 132. In the sample 3, at least the free layer 25 has a region 133 in which the concentration of the additive element Ag increases as the distance from the nonmagnetic conductive layer 24 decreases, the region being adjacent to the nonmagnetic conductive layer 24. The MR ratio of the sample 3 is as high at 9.0%.

Figure 14:
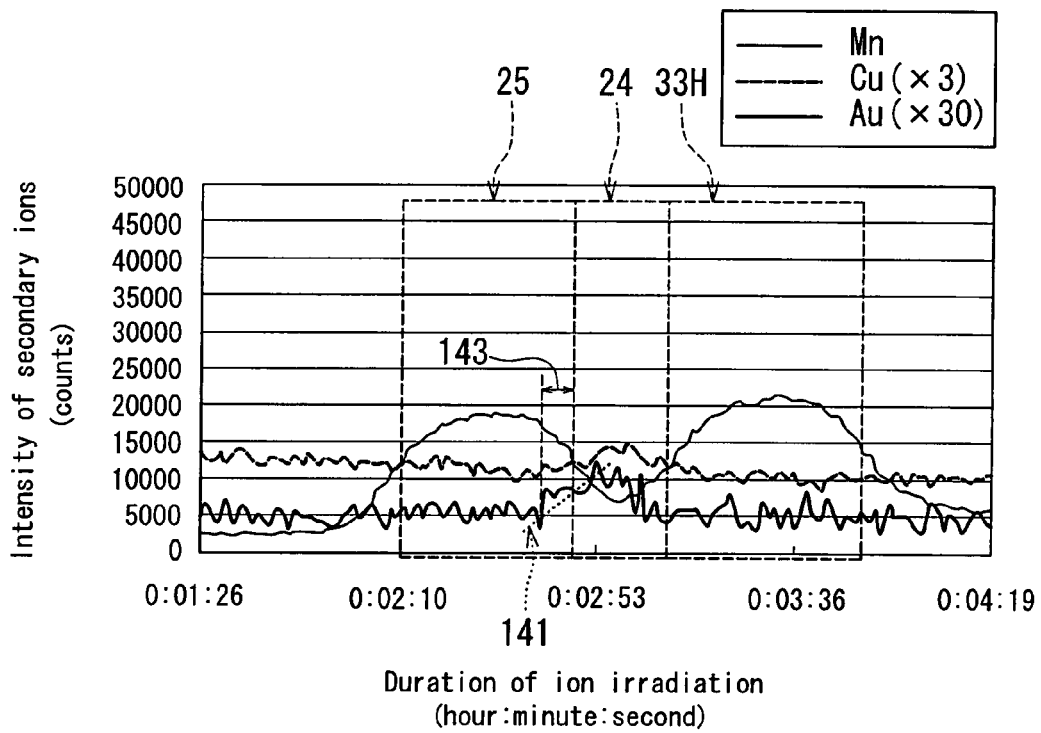
FIG. 14 is a plot showing a result of the experiment indicating the effect of the embodiment of the invention.

In the sample 4, the nonmagnetic conductive layer 24 is made of Cu, and each of the Heusler alloy layer 33H of the inner layer 33 and the free layer 25 is formed of a Heusler alloy layer that contains a Heusler alloy and an additive element Au. As shown in FIG. 14, the sample 4 has a region in which the concentration of the additive element Au increases as the distance from the middle of the nonmagnetic conductive layer 24 along the direction of thickness decreases, the region being formed near the interface between the free layer 25 and the nonmagnetic conductive layer 24 and including this interface. In FIG. 14 a dotted line with numeral 141 indicates the gradient of concentration (intensity of secondary ions) of the additive element Au. According to the results of measurement shown in FIG. 14, although there are small variations in intensity of the secondary ions, these variations result from measurement errors. It is assumed that the gradient of concentration of the additive element Au measured in a neighborhood of the interface between the free layer 25 and the nonmagnetic conductive layer 24 is such one indicated with the dotted line with numeral 141. In the sample 4, at least the free layer 25 has a region 143 in which the concentration of the additive element Au increases as the distance from the nonmagnetic conductive layer 24 decreases, the region being adjacent to the nonmagnetic conductive layer 24. The MR ratio of the sample 4 is as high as 9.1%.

Figure 15:
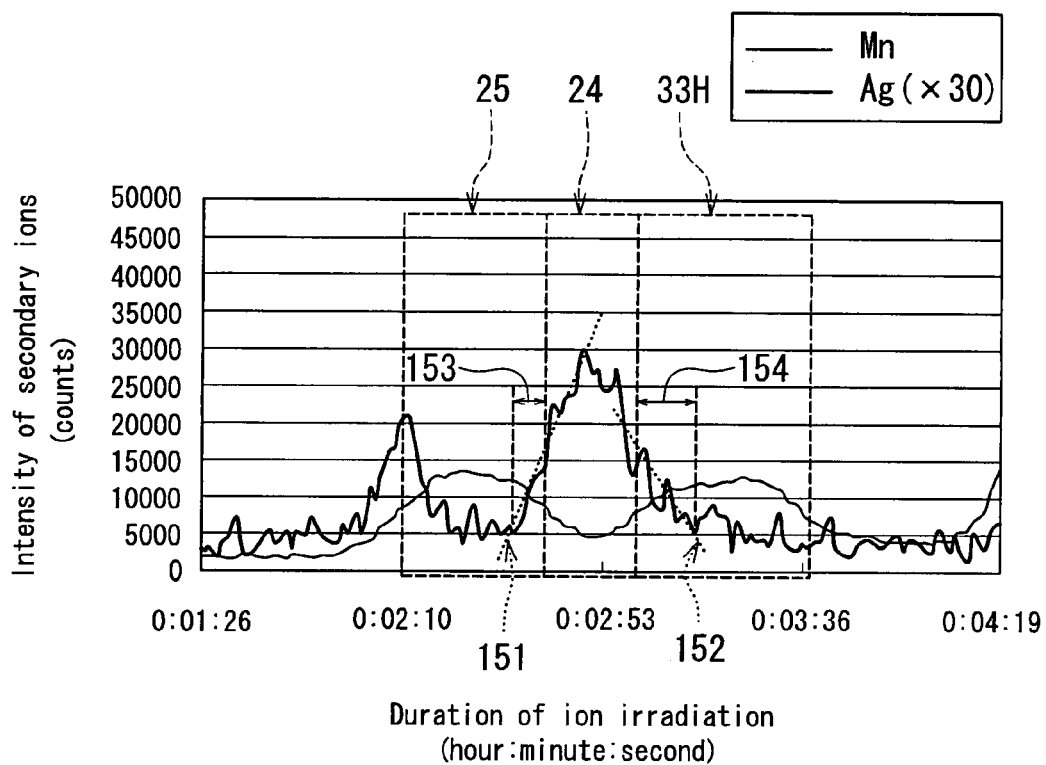
FIG. 15 is a plot showing a result of the experiment indicating the effect of the embodiment of the invention.

In the sample 5, the nonmagnetic conductive layer 24 is made of Ag, and each of the Heusler alloy layer 33H of the inner layer 33 and the free layer 25 is formed of a Heusler alloy layer that contains a Heusler alloy and the additive element Ag. As shown in FIG. 15, the sample 5 has a region in which the concentration of the additive element Ag increases as the distance from the middle of the nonmagnetic conductive layer 24 along the direction of thickness decreases, the region being formed near the interface between the free layer 25 and the nonmagnetic conductive layer 24 and including this interface. In addition, the sample 5 has a region in which the concentration of the additive element Ag increases as the distance from the middle of the nonmagnetic conductive layer 24 along the direction of thickness decreases, the region being formed near the interface between the Heusler alloy layer 33H of the inner layer 33 and the nonmagnetic conductive layer 24 and including this interface. In FIG. 15 each of two dotted lines with numerals 151 and 152 indicates the gradient of concentration (intensity of secondary ions) of the additive element Ag. According to the results of measurement shown in FIG. 15, although there are small variations in intensity of the secondary ions, these variations result from measurement errors. It is assumed that the gradients of concentration of the additive element Ag in a neighborhood of the interface between the free layer 25 and the nonmagnetic conductive layer 24 and in a neighborhood of the interface between the Heusler alloy layer 33H of the inner layer 33 and the nonmagnetic conductive layer 24 are such ones indicated with the two dotted lines with numerals 151 and 152. In the sample 5, the free layer 25 and the Heusler alloy layer 33H of the inner layer 33 respectively have regions 153 and 154 in which the concentration of the additive element Ag increases as the distance from the nonmagnetic conductive layer 24 decreases, the regions being adjacent to the nonmagnetic conductive layer 24. The MR ratio of the sample 5 is as high as 8.6%.

Figure 16:
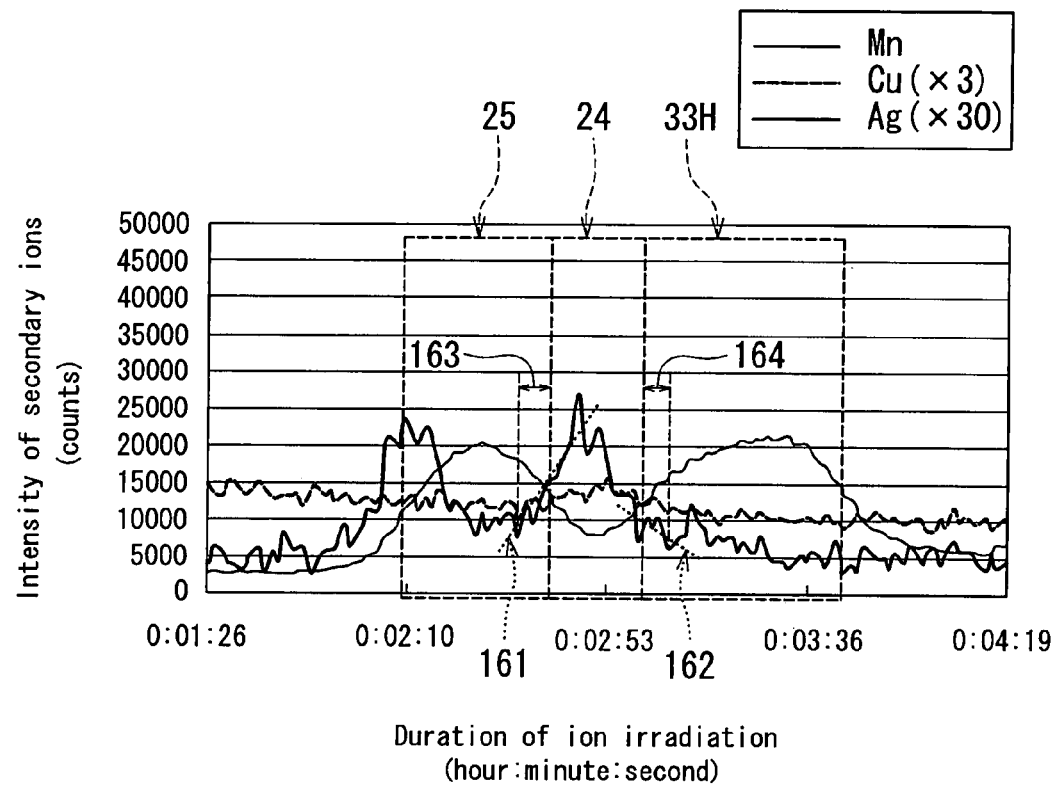
FIG. 16 is a plot showing a result of the experiment indicating the effect of the embodiment of the invention.

In the sample 6, the nonmagnetic conductive layer 24 is made of CuAg, and each of the Heusler alloy layer 33H of the inner layer 33 and the free layer 25 is formed of a Heusler alloy layer that contains a Heusler alloy and the additive element Ag. As shown in FIG. 16, the sample 6 has a region in which the concentration of the additive element Ag increases as the distance from the middle of the nonmagnetic conductive layer 24 along the direction of thickness decreases, the region being formed near the interface between the free layer 25 and the nonmagnetic conductive layer 24 and including this interface. In addition, the sample 6 has a region in which the concentration of the additive element Ag increases as the distance from the middle of the nonmagnetic conductive layer 24 along the direction of thickness decreases, the region being formed near the interface between the Heusler alloy layer 33H of the inner layer 33 and the nonmagnetic conductive layer 24 and including this interface. In FIG. 16 each of two dotted lines with numerals 161 and 162 indicates the gradient of concentration (intensity of secondary ions) of the additive element Ag. According to the results of measurement shown in FIG. 16, although there are small variations in intensity of the secondary ions, these variations result from measurement errors. It is assumed that the gradients of concentration of the additive element Ag in a neighborhood of the interface between the free layer 25 and the nonmagnetic conductive layer 24 and in a neighborhood of the interface between the Heusler alloy layer 33H of the inner layer 33 and the nonmagnetic conductive layer 24 are such ones indicated with the two dotted lines with numerals 161 and 162. In the sample 6, the free layer 25 and the Heusler alloy layer 33H of the inner layer 33 respectively have regions 163 and 164 in which the concentration of the additive element Ag increases as the distance from the nonmagnetic conductive layer 24 decreases, the regions being adjacent to the nonmagnetic conductive layer 24. The MR ratio of the sample 6 is as high as 9.5%.

The foregoing results of the experiment indicate that, when at least one of the pinned layer 23 (the inner layer 33) and the free layer 25 includes the region in which the concentration of the additive element increases as the distance from the nonmagnetic conductive layer 24 decreases, the region being adjacent to the nonmagnetic conductive layer 24, the MR ratio of the MR element 5 is higher, compared with the case in which neither the pinned layer 23 nor the free layer 25 includes the above-mentioned region.

Figure 17:
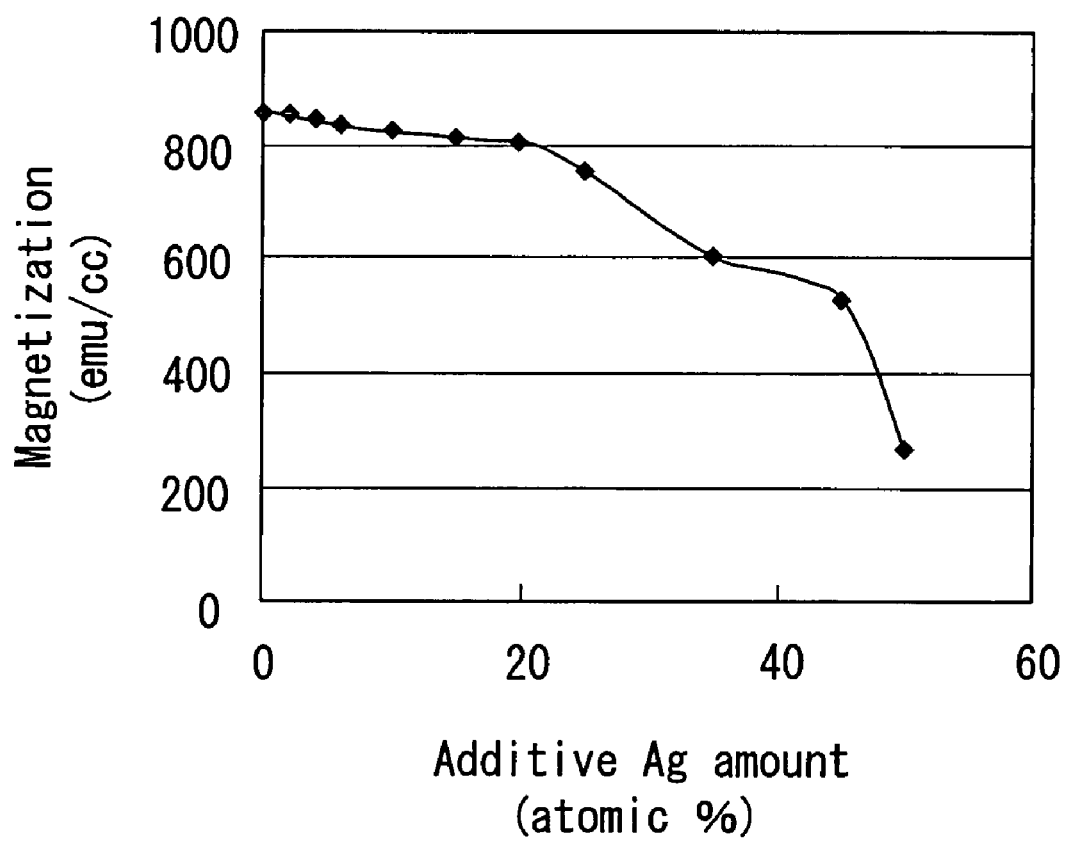
FIG. 17 is a plot showing a result of an experiment performed for examining a preferred range of proportion of an additive element of the embodiment of the invention.

Results of an experiment performed to examine a preferred range of the additive element of the embodiment will now be described. In the experiment a Heusler alloy layer containing a Heusler alloy whose composition is $CO_2MnSi$ and the additive element Ag was fabricated, and the magnetization of the Heusler alloy layer was measured. Here, in a film that will be the Heusler alloy layer in a state before heat treatment, the proportion of the additive element Ag with respect to the total amount of the elements constituting the Heusler alloy is called an additive Ag amount. In the experiment there were formed a plurality of films to be the Heusler alloy layers having different additive Ag amounts as shown on Table 3, and heat treatment was given to the films at a temperature of 400° C. to fabricate a plurality of Heusler alloy layers. Table 3 shows the magnetization of each of the Heusler alloy layers. FIG. 17 shows the relationship between the additive Ag amount and the magnetization of these Heusler alloy layers.

TABLE 3

| Additive Ag amount (atomic %) | Magnetization (emu/cc) |
|---|---|
| 0 | 860 |
| 2 | 855 |
| 4 | 852 |
| 6 | 835 |
| 10 | 825 |
| 15 | 812 |
| 20 | 805 |
| 25 | 754 |
| 35 | 604 |
| 45 | 525 |
| 50 | 265 |

As shown in FIG. 17, while the magnetization is nearly constant where the additive Ag amount is in the range of 2 to 20 atomic percent, the magnetization of the Heusler alloy layer decreases as the additive Ag amount increases where the additive Ag amount is greater than 20 atomic percent. A great magnetization is required for the Heusler alloy layer used in the pinned layer 23 (the inner layer 33) and the free layer 25. In view of this point, it is preferred that the additive Ag amount, that is, the proportion of the additive element Ag with respect to the total amount of elements constituting the Heusler alloy in the film that will be the Heusler alloy layer, be within a range of 2 to 20 atomic percent inclusive.

In the embodiment, each of the pinned layer 23 and the free layer 25 includes the Heusler alloy layer. However, only one of the pinned layer 23 and the free layer 25 may include the Heusler alloy layer. The above-described effects are achieved in this case, too.

Figure 4:
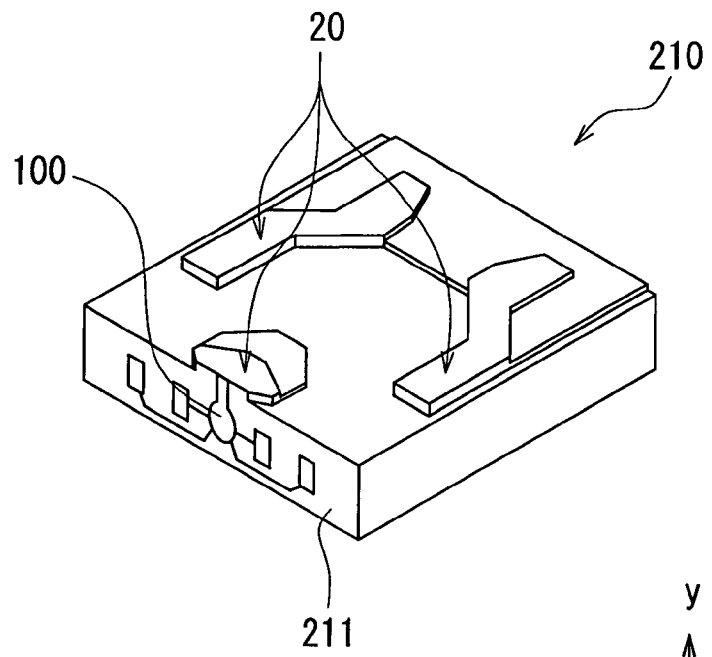
FIG. 4 is a perspective view illustrating a slider incorporated in a head gimbal assembly of the embodiment of the invention.

A head gimbal assembly, a head arm assembly and a magnetic disk drive of the embodiment will now be described. Reference is made to FIG. 4 to describe a slider 210 incorporated in the head gimbal assembly. In the magnetic disk drive the slider 210 is placed to face toward a magnetic disk platter that is a circular-plate-shaped recording medium to be driven to rotate. The slider 210 has a base body 211 made up mainly of the substrate 1 and the overcoat layer 17 of FIG. 2. The base body 211 is nearly hexahedron-shaped. One of the six surfaces of the base body 211 faces toward the magnetic disk platter. The medium facing surface 20 is formed in this one of the surfaces. When the magnetic disk platter rotates in the z direction of FIG. 4, an airflow passes between the magnetic disk platter and the slider 210, and a lift is thereby generated below the slider 210 in the y direction of FIG. 4 and exerted on the slider 210. The slider 210 flies over the magnetic disk platter by means of the lift. The x direction of FIG. 4 is across the tracks of the magnetic disk platter. A thin-film magnetic head 100 of the embodiment is formed near the air-outflow-side end (the end located at the lower left of FIG. 4) of the slider 210.

Figure 5:
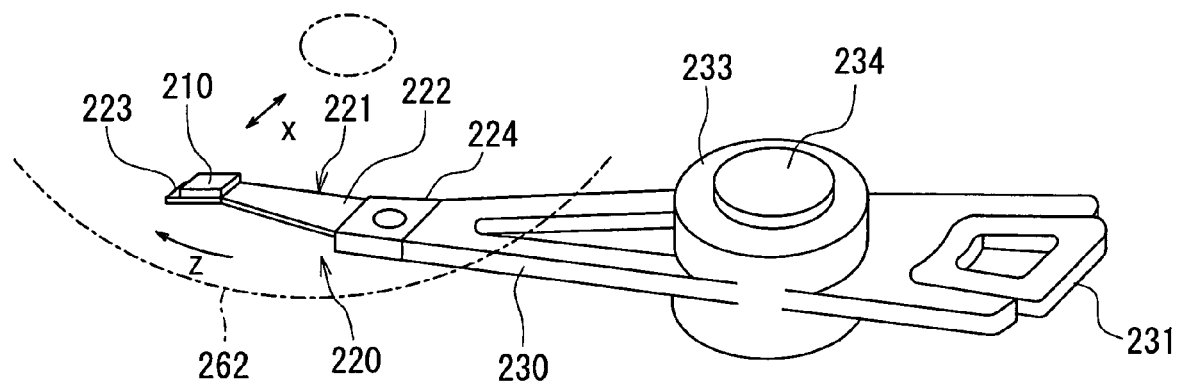
FIG. 5 is a perspective view illustrating a head arm assembly of the embodiment of the invention.

Reference is now made to FIG. 5 to describe the head gimbal assembly 220 of the embodiment. The head gimbal assembly 220 incorporates the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

FIG. 5 illustrates the head arm assembly of the embodiment. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 6:
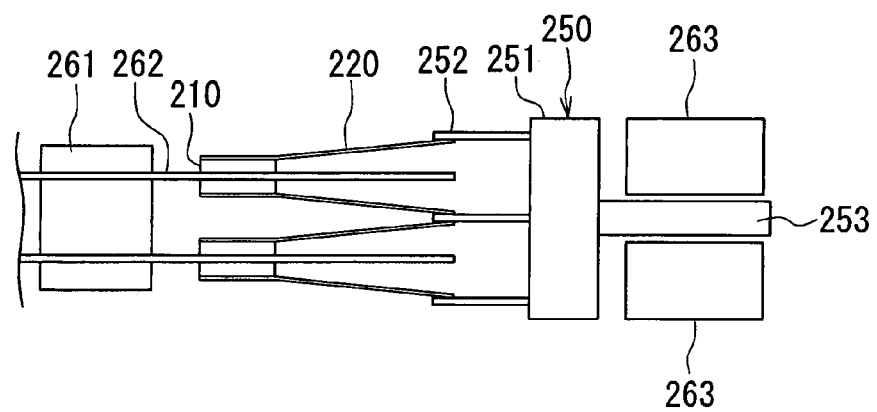
FIG. 6 is a view for illustrating the main part of a magnetic disk drive of the embodiment of the invention.
Figure 7:
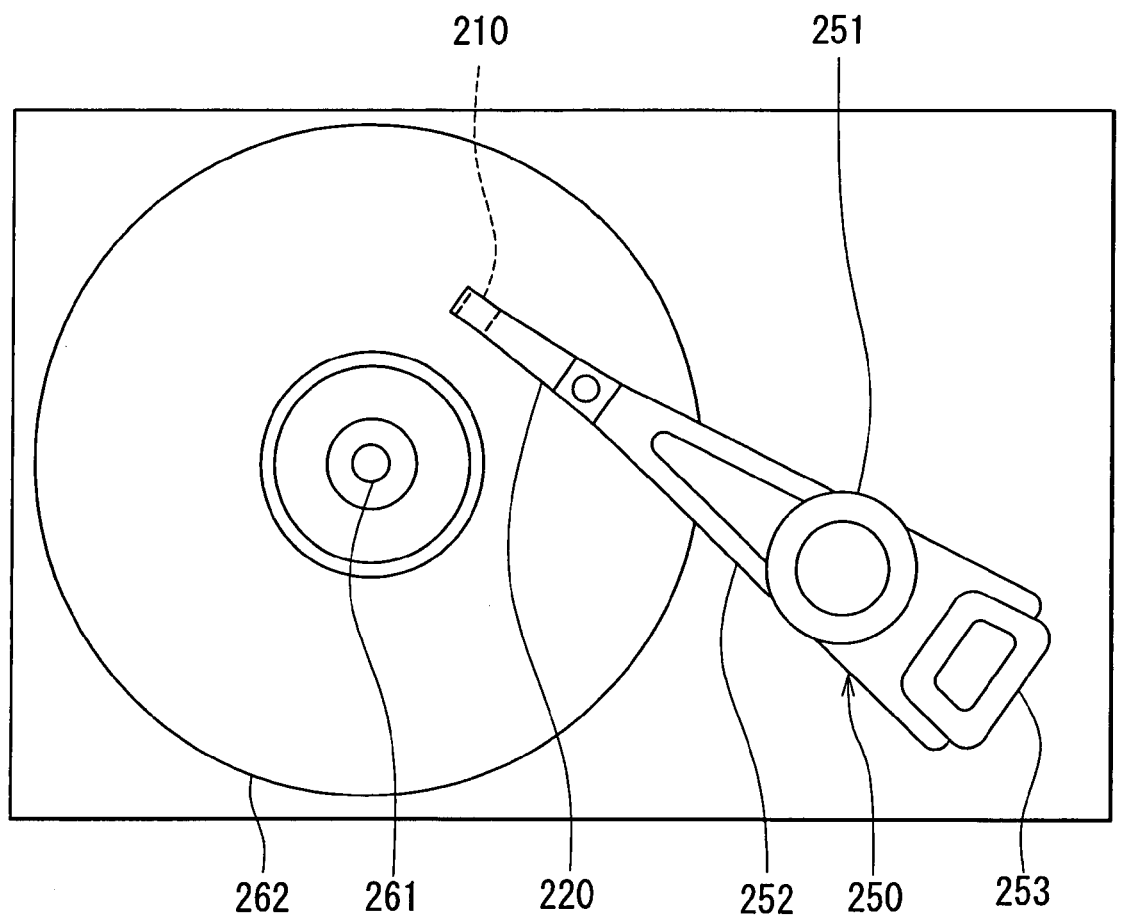
FIG. 7 is a top view of the magnetic disk drive of the embodiment of the invention.

Reference is now made to FIG. 6 and FIG. 7 to describe an example of the head stack assembly and the magnetic disk drive of the embodiment. FIG. 6 illustrates the main part of the magnetic disk drive. FIG. 7 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment the actuator moves the slider 210 across the tracks of the magnetic disk platter 262 and aligns the slider 210 with respect to the magnetic disk platter 262. The thin-film magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the foregoing thin-film magnetic head of the embodiment.

The present invention is not limited to the foregoing embodiment but may be practiced in still other ways. In the invention, for example, the pinned layer 23 is not limited to a synthetic pinned layer.

While the thin-film magnetic head disclosed in the embodiments has such a configuration that the read head is formed on the base body and the write head is stacked on the read head, it is also possible that the read head is stacked on the write head.

If the thin-film magnetic head is dedicated to reading, the thin-film magnetic head may have a configuration incorporating a read head only.

The magnetoresistive element of the invention can be used not only for a read head of a thin-film magnetic head but also for other applications such as a magnetic sensor.

Obviously many modifications and variations of the present invention are possible in the light of the above teachings. It is therefore to be understood that within the scope of the appended claims the invention may be practiced otherwise than as specifically described.

What is claimed is:

1. A magnetoresistive element comprising:
a nonmagnetic conductive layer having a first surface and a second surface that face toward opposite directions;
a pinned layer disposed adjacent to the first surface of the nonmagnetic conductive layer, a direction of magnetization in the pinned layer being fixed; and
a free layer disposed adjacent to the second surface of the nonmagnetic conductive layer, a direction of magnetization in the free layer changing in response to an external magnetic field,
wherein a current for detecting magnetic signals is fed in a direction intersecting a plane of each of the foregoing layers;
the nonmagnetic conductive layer contains an element that is a main component of the nonmagnetic conductive layer;
at least one of the pinned layer and the free layer includes a Heusler alloy layer;
the Heusler alloy layer contains a Heusler alloy in which atoms of a magnetic metallic element are respectively placed at body-centered positions of unit cells, and contains an additive element that is a nonmagnetic metallic element that does not constitute the Heusler alloy, the additive element being different from the element that is the main component of the nonmagnetic conductive layer; and
the at least one of the pinned layer and the free layer includes a region in which a concentration of the additive element increases as a distance from the nonmagnetic conductive layer decreases, the region being adjacent to the nonmagnetic conductive layer.

2. The magnetoresistive element according to claim 1, wherein the element that is the main component of the nonmagnetic conductive layer is Cu, and the additive element is one of Ag and Au.

3. A thin-film magnetic head comprising: a medium facing surface that faces toward a recording medium; a magnetoresistive element disposed near the medium facing surface to detect a signal magnetic field sent from the recording medium; and a pair of electrodes for feeding a current for detecting magnetic signals to the magnetoresistive element in a direction intersecting a plane of each layer making up the magnetoresistive element, the magnetoresistive element comprising:
a nonmagnetic conductive layer having a first surface and a second surface that face toward opposite directions;
a pinned layer disposed adjacent to the first surface of the nonmagnetic conductive layer, a direction of magnetization in the pinned layer being fixed; and
a free layer disposed adjacent to the second surface of the nonmagnetic conductive layer, a direction of magnetization in the free layer changing in response to an external magnetic field, wherein:
in the magnetoresistive element, the current for detecting magnetic signals is fed in the direction intersecting the plane of each of the foregoing layers;
the nonmagnetic conductive layer contains an element that is a main component of the nonmagnetic conductive layer;
at least one of the pinned layer and the free layer includes a Heusler alloy layer;
the Heusler alloy layer contains a Heusler alloy in which atoms of a magnetic metallic element are respectively placed at body-centered positions of unit cells, and contains an additive element that is a nonmagnetic metallic element that does not constitute the Heusler alloy, the additive element being different from the element that is the main component of the nonmagnetic conductive layer; and
the at least one of the pinned layer and the free layer includes a region in which a concentration of the additive element increases as a distance from the nonmagnetic conductive layer decreases, the region being adjacent to the nonmagnetic conductive layer.

4. A head gimbal assembly comprising: a slider including a thin-film magnetic head and disposed to face toward a recording medium; and a suspension flexibly supporting the slider,
the thin-film magnetic head comprising: a medium facing surface that faces toward the recording medium; a magnetoresistive element disposed near the medium facing surface to detect a signal magnetic field sent from the recording medium; and a pair of electrodes for feeding a current for detecting magnetic signals to the magnetoresistive element in a direction intersecting a plane of each layer making up the magnetoresistive element,
the magnetoresistive element comprising:
a nonmagnetic conductive layer having a first surface and a second surface that face toward opposite directions;

a pinned layer disposed adjacent to the first surface of the nonmagnetic conductive layer, a direction of magnetization in the pinned layer being fixed; and a free layer disposed adjacent to the second surface of the nonmagnetic conductive layer, a direction of magnetization in the free layer changing in response to an external magnetic field, wherein:

in the magnetoresistive element, the current for detecting magnetic signals is fed in the direction intersecting the plane of each of the foregoing layers;

the nonmagnetic conductive layer contains an element that is a main component of the nonmagnetic conductive layer;

at least one of the pinned layer and the free layer includes a Heusler alloy layer;

the Heusler alloy layer contains a Heusler alloy in which atoms of a magnetic metallic element are respectively placed at body-centered positions of unit cells, and contains an additive element that is a nonmagnetic metallic element that does not constitute the Heusler alloy, the additive element being different from the element that is the main component of the nonmagnetic conductive layer; and the at least one of the pinned layer and the free layer includes a region in which a concentration of the additive element increases as a distance from the nonmagnetic conductive layer decreases, the region being adjacent to the nonmagnetic conductive layer.

5. A head arm assembly comprising: a slider including a thin-film magnetic head and disposed to face toward a recording medium; a suspension flexibly supporting the slider; and an arm for making the slider travel across tracks of the recording medium, the suspension being attached to the arm, the thin-film magnetic head comprising: a medium facing surface that faces toward the recording medium; a magnetoresistive element disposed near the medium facing surface to detect a signal magnetic field sent from the recording medium; and a pair of electrodes for feeding a current for detecting magnetic signals to the magnetoresistive element in a direction intersecting a plane of each layer making up the magnetoresistive element, the magnetoresistive element comprising:

a nonmagnetic conductive layer having a first surface and a second surface that face toward opposite directions;

a pinned layer disposed adjacent to the first surface of the nonmagnetic conductive layer, a direction of magnetization in the pinned layer being fixed; and a free layer disposed adjacent to the second surface of the nonmagnetic conductive layer, a direction of magnetization in the free layer changing in response to an external magnetic filed, wherein:

in the magnetoresistive element, the current for detecting magnetic signals is fed in the direction intersecting the plane of each of the foregoing layers;

the nonmagnetic conductive layer contains an element that is a main component of the nonmagnetic conductive layer;

at least one of the pinned layer and the free layer includes a Heusler alloy layer;

the Heusler alloy layer contains a Heusler alloy in which atoms of a magnetic metallic element are respectively placed at body-centered positions of unit cells, and contains an additive element that is a nonmagnetic metallic element that does not constitute the Heusler alloy, the additive element being different from the element that is the main component of the nonmagnetic conductive layer; and the at least one of the pinned layer and the free layer includes a region in which a concentration of the additive element increases as a distance from the nonmagnetic conductive layer decreases, the region being adjacent to the nonmagnetic conductive layer.

6. A magnetic disk drive comprising: a slider including a thin-film magnetic head and disposed to face toward a recording medium that is driven to rotate; and an alignment device supporting the slider and aligning the slider with respect to the recording medium, the thin-film magnetic head comprising: a medium facing surface that faces toward the recording medium; a magnetoresistive element disposed near the medium facing surface to detect a signal magnetic field sent from the recording medium; and a pair of electrodes for feeding a current for detecting magnetic signals to the magnetoresistive element in a direction intersecting a plane of each layer making up the magnetoresistive element, the magnetoresistive element comprising:

a nonmagnetic conductive layer having a first surface and a second surface that face toward opposite directions;

a pinned layer disposed adjacent to the first surface of the nonmagnetic conductive layer, a direction of magnetization in the pinned layer being fixed; and a free layer disposed adjacent to the second surface of the nonmagnetic conductive layer, a direction of magnetization in the free layer changing in response to an external magnetic field, wherein:

in the magnetoresistive element, the current for detecting magnetic signals being fed in the direction intersecting the plane of each of the foregoing layers;

the nonmagnetic conductive layer contains an element that is a main component of the nonmagnetic conductive layer;

at least one of the pinned layer and the free layer includes a Heusler alloy layer;

the Heusler alloy layer contains a Heusler alloy in which atoms of a magnetic metallic element are respectively placed at body-centered positions of unit cells, and contains an additive element that is a nonmagnetic metallic element that does not constitute the Heusler alloy, the additive element being different from the element that is the main component of the nonmagnetic conductive layer; and the at least one of the pinned layer and the free layer includes a region in which a concentration of the additive element increases as a distance from the nonmagnetic conductive layer decreases, the region being adjacent to the nonmagnetic conductive layer.

* * * * *